United States Patent

Mayer

[11] Patent Number: 5,303,689
[45] Date of Patent: Apr. 19, 1994

[54] CONTOUR ROPE SAW FOR STONES OR SIMILAR WORKPIECES

[76] Inventor: Wolfgang Mayer, Nonntaler Hauptstrasse 102, A-5020 Salzburg, Austria

[21] Appl. No.: 977,906
[22] Filed: Nov. 18, 1992

[30] Foreign Application Priority Data

Nov. 19, 1991 [DE] Fed. Rep. of Germany ....... 4138106

[51] Int. Cl.$^5$ .............................................. B28D 1/08
[52] U.S. Cl. ................................... 125/21; 125/13.03
[58] Field of Search ............. 125/21, 12, 16.02, 13.03; 83/651.1, 661, 789, 811, 812, 813, 935

[56] References Cited

U.S. PATENT DOCUMENTS

| | | |
|---|---|---|
| 1,706,406 | 3/1929 | Legge . |
| 1,903,518 | 4/1933 | Simmons et al. . |
| 2,855,043 | 10/1958 | Opferkuch ............................. 125/21 |
| 2,866,448 | 12/1958 | Dessureau et al. ..................... 125/21 |
| 3,299,877 | 1/1967 | Grage ...................................... 125/21 |
| 3,599,623 | 8/1971 | Phy ......................................... 125/21 |
| 4,016,856 | 4/1977 | McLauglin ............................ 125/21 |
| 4,077,301 | 3/1978 | Brahm ................................. 83/651.1 |
| 4,111,085 | 9/1978 | Johnson ................................ 83/813 |
| 4,566,428 | 1/1986 | Roujon ................................. 125/21 |

FOREIGN PATENT DOCUMENTS 4021797  1/1992  Fed. Rep. of Germany ........ 125/21

Primary Examiner—Bruce M. Kisliuk
Assistant Examiner—Bryan Reichenbach
Attorney, Agent, or Firm—Flynn, Thiel, Boutell & Tanis

[57] ABSTRACT

A contour rope saw for stones and similar workpieces has a slide (3) mounted displaceably in one direction (x) for taking up the workpiece (4) and an endlessly circulating rope (17) with a horizontal strand (17') between two deflection rolls (14, 15) that are vertically movable on a supporting structure (5). A further deflection roll (16) is spaced from the supporting structure (5) in the sliding direction (x) of the slide (6). The rotational axes (20 to 22) of the deflection rolls (14 to 16) are substantially vertical.

9 Claims, 2 Drawing Sheets

5,303,689

CONTOUR ROPE SAW FOR STONES OR SIMILAR WORKPIECES

BACKGROUND OF THE INVENTION

Contour rope saws are known in the prior art. Typically, rotational axes of the two deflection rolls between which the cutting strand of the rope extends are horizontal and parallel to the sliding direction of the slide. Although the known saw has largely proven to work excellently it requires considerable space.

The present invention is based on the problem of substantially reducing the space required by the known apparatus without impairing its performance in any way.

BRIEF DESCRIPTION OF THE DRAWINGS

In the following an embodiment of the inventive contour rope saw shall be explained with reference to the drawings, in which.

DETAILED DESCRIPTION OF THE PRESENT INVENTION

Figure 1:
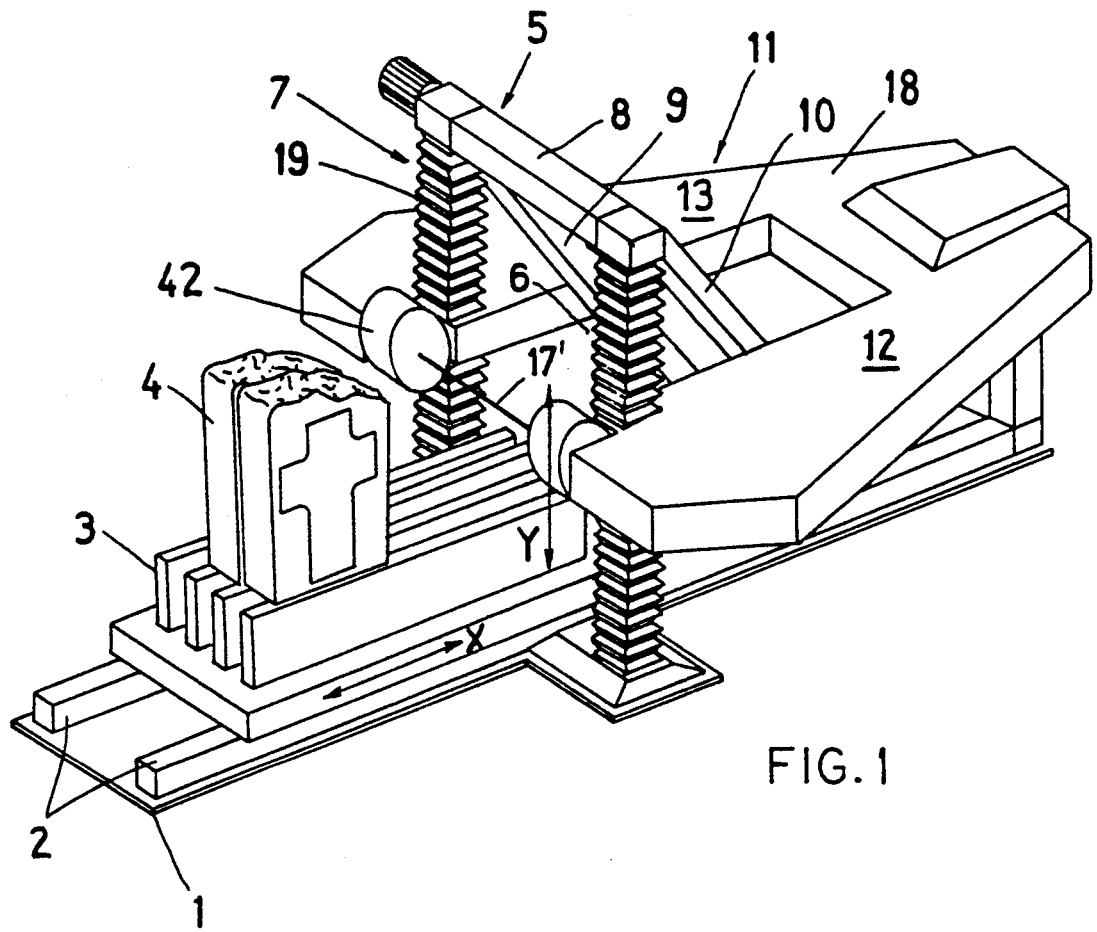
FIG. 1 shows a perspective view of the contour rope saw.

According to FIG. 1 the contour rope saw has a base 1 provided with guide tracks 2 on which a slide 3 displaceable in the x-direction is mounted that bears workpiece 4 to be provided with a certain contour.

Above base 1 there is a portal-like supporting structure 5 with two pillars 6, 7 on which a crossbar 8 rests. Supporting structure 5 is additionally supported on base 1 via obliquely extending supporting struts 9, 10.

A horizontally disposed frame 11 is also provided that has a forked design, the ends of two legs 12, 13 of forked frame 11 extending to one and the other pillar 6, 7 of supporting structure 5 and being mounted thereon so as to be movable in the y-direction, i.e, vertically.

Figure 4:
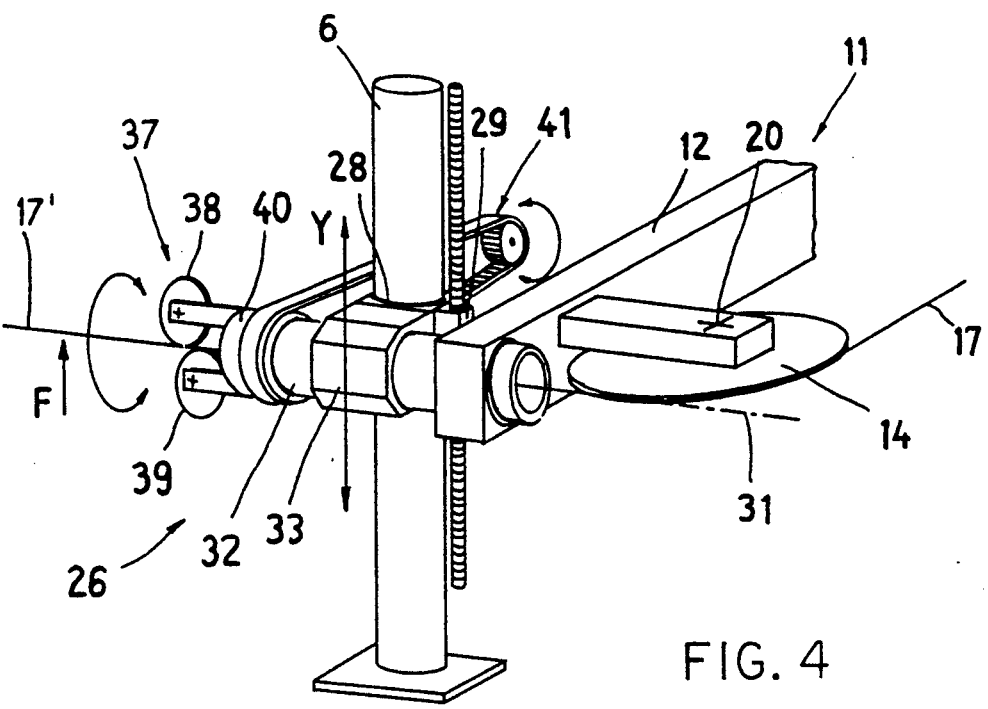
FIG. 4 shows a perspective view of details of the link of the frame with the supporting structure.
Figure 2:
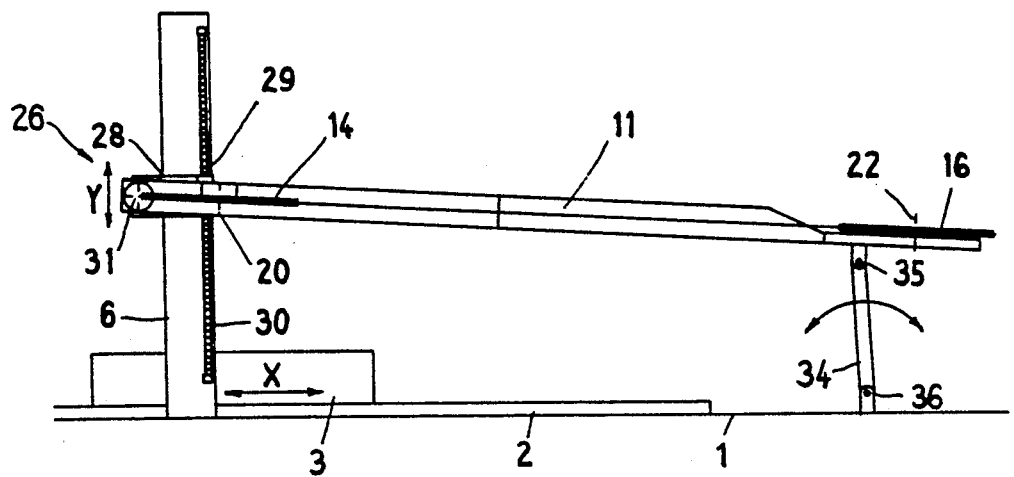
FIGS. 2 and 3 show a greatly schematized side view and top view of the saw of FIG. 1 without a jacket or other details.
Figure 3:
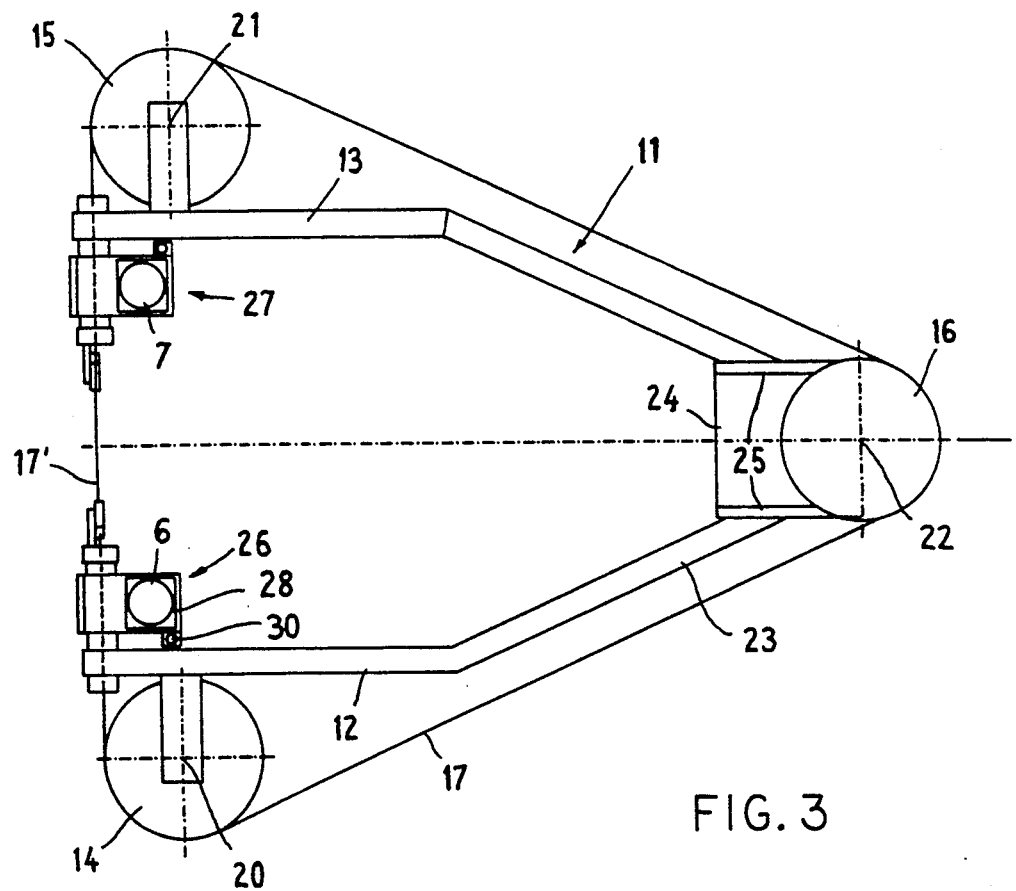

On frame 11 three horizontally disposed deflection rolls 14, 15 and 16 are rotatably mounted about which an endless rope 17 runs (FIGS. 2 to 4). Two deflection rolls 14, 15 are disposed at the ends of legs 12, 13 of frame 11 facing supporting structure 5. Strand 17' of the rope passing into workpiece 4 extends therebetween, horizontally and perpendicular to sliding direction x of slide 3.

Forked frame 11 is provided in FIG. 1 with a jacket 18. Similarly, portal pillars 6, 7 are each cased in FIG. 1 with a bellows 19 that is fastened to the top and underside of jacket 18 of frame 11.

According to FIG. 2 deflection rolls or wheels 14 to 16 have substantially vertical rotational axes 20 to 22 extending from bottom to top and parallel to one other. Deflection roll 16 is disposed on portion 23 of frame 11 connecting legs 12, 13, i.e. spaced from supporting structure 5 in sliding direction x of slide 3.

Deflection roll 16 is formed as a tension roll for rope 17. It is thus fastened to a tension slide 24 that is displaceable in sliding direction x of slide 3 on a guide means 25 disposed on connecting portion 23 by an operating means (not shown), for example pneumatically or hydraulically.

Instead of one deflection roll 16 spaced from supporting structure 5 on connecting portion 23, two or more deflection rolls can also be provided on frame 11 there. One of deflection rolls 14 to 16 is driven by a motor (not shown).

The two ends of legs 12, 13 of frame 11 and thus deflection rolls 14, 15 adjacent supporting structure 5 are mounted so as to be vertically movable by guide means 26, 27 on pillars 6, 7 of supporting structure 5. Guide means 26, 27 have the same design so that it suffices to explain guide means 26. According to FIG. 2 guide means 26 comprises a sleeve 28 displaceable along pillar 6 that is movable up and down along pillar 6 by a helical gear. That is, on sleeve 28 there is a nut 29 which is engaged by a threaded spindle 30 extending along pillar 6 and driven by a motor (not shown). Guide means 26, 27 are moved in synchronism.

The two ends of legs 12, 13 of frame 11 are pivoted to guide means 26, 27 about a horizontal axis 31. According to FIG. 4 a cross tube 32 is fastened for this purpose to sleeve 28 of each guide means 26, 27, for example with a bracket 33. The particular leg 12, 13 of frame 11 is pivoted to cross tube 32. Strand 17' of the rope extends through the longitudinal axis of cross tube 32; i.e. swiveling axis 31 of frame 11 on guide means 26, 27 on pillars 6, 7 of supporting structure 5 coincides with the axis of cutting strand 17' of the rope extending between deflection rolls 14, 15. This ensures that strand 17' of the rope is moved the same distance as sleeve 28.

At its end facing away from supporting structure 5, i.e. in the area of connecting portion 23, frame 11 is provided with a rocker 34. Rocker 34 is pivoted to frame 11 about an axis 35 and to base 1 about axis 36. Swiveling axes 35 and 36 of rocker 34 extend parallel to swiveling axis 31.

When cutting strand 17' of the rope saws into workpiece 4 the cutting pressure shown by arrow F in FIG. 4 acts on strand 17'. To take up this cutting pressure a rope guide 37 is provided on the inner end of each cross tube 32. Rope guide 37 comprises a rope guide roll 38 taking up the cutting pressure and a rigid or spring-loaded mating roll 39 for rope guide roll 38. Rolls 38, 39 are fastened to a ring 40 mounted on cross tube 32 so as to rotate about swiveling axis 31 and rotatable by a toothed belt or other drive 41 such that rope guide roll 38 is aligned precisely against cutting pressure F. To take account of the wheel lining wear, rope guide roll 38 is designed to be adjustable toward strand 17' of the rope. Rope guide 37 is disposed in a housing 42 (FIG. 1).

An electronic control means (not shown) converts the x, y-coordinates for the desired contours of workpiece 4 into corresponding motions of slide 3 and frame 11 so that workpiece 4 is given exactly the desired form. An electronic control means is preferably used that permits numerical programming of the data in the x, y-directions.

Rope guide rolls 38, 39 are made to follow the contour by a tangential control means in such a way that they counteract cutting pressure F.

Rope guide rolls 38, 39 are disposed so as to be adjustable by the amount of wear of the rope guide groove to hold rope 17 exactly in swiveling axis 31.

I claim:

1. A contour rope saw for cutting and shaping stones and similar workpieces, the rope saw comprising:
   a supporting structure;

a slide secured to said supporting structure for horizontally displacing a stone along a sliding axis;

an endlessly circulating rope with a horizontal cutting strand extending perpendicular to the sliding axis of the slide;

first and second guided deflection rollers that are movable vertically with respect to the supporting structure, the horizontal cutting strand extending between the first and second deflection rollers;

a planar frame extending from the supporting structure generally in a direction of the sliding axis for supporting the first and second deflection rollers;

a third deflection roller mounted on said frame and being spaced away from the supporting structure along the sliding axis of the slide, the first, second and third deflection rollers each having a rotational axis extending traverse to said frame;

a frame guide means slidably mounted on said supporting structure and pivotally secured to said frame for vertically moving the first and second deflection rollers with respect to the supporting structure, said frame being pivoted with respect to said frame guide means about a swiveling axis extending coincident with the horizontal cutting strand;

a ring member rotatably secured to said frame guide means and being rotatable about said swiveling axis; and a rope guide roller fixedly secured to said ring member for taking up a cutting pressure exerted on the horizontal cutting strand.

2. The saw of claim 1, wherein the swiveling axis of the frame is formed by first and second cross tubes which permit the horizontal cutting strand to pass through and which are fastened to the frame guide means.

3. The saw of claim 1, wherein said third deflection roller is a tension roll displaceable in a direction generally parallel with the sliding axis of the slide.

4. The saw of claim 1, wherein said frame is supported on a base via a rocker spaced apart from said frame guide means and having rotational axes extending parallel to said swiveling axis of said frame on said guide means.

5. A contour rope saw for cutting and shaping a stone, or other similar workpiece, comprising:

a base member having a longitudinal axis;

a slide member secured to said base member for supporting and displacing the stone along a sliding axis extending parallel with said base member;

a support structure having first and second spaced-apart pillars secured to, and projecting perpendicularly away from said base member, said slide member disposed between said pillars;

a frame structure spaced-apart from, and extending substantially along said base member and having first and second spaced-apart leg portions joined to a connection portion, said connecting portion coupled to said base member;

first and second frame guide means slidably mounted on said first and second pillars, respectively, for pivotally securing said first and second leg portions of said frame structure to said first and second pillars, respectively;

first and second deflection rollers secured to said first and second leg portions, respectively, and a third deflection roller secured to said connecting portion for rotatably supporting and guiding an endlessly circulating rope, said first, second and third deflection rollers oriented in a plane substantially parallel to said frame structure, and each having an axis of rotation projecting substantially perpendicular to said frame structure;

said rope including a horizontal cutting strand extending between said first and second deflection rollers perpendicular to said sliding axis of said slide member; and said first and second leg portions pivoting with respect to said frame guide means about a swiveling axis, said swiveling axis being coincident with said horizontal cutting strand.

6. The rope saw as claimed in claim 5, further including first and second hollow cross tubes secured to said first and second frame guide means respectively, each said cross tube extending coaxially with said swiveling axis and having a portion of said horizontal cutting strand passing therethrough, and first and second rope guide means secured to mutually opposing ends of said first and second cross tubes, respectively.

7. The rope saw as claimed in claim 6, wherein said first and second rope guide means each comprise a rope guide roller, a mutually opposing mating roller, and a ring for rotatably securing said rope guide and mating rollers to said respective cross tube, said rope guide and mating rollers being rotatably positioned to oppose a cutting force generated by said horizontal cutting strand passing therebetween.

8. The rope saw as claimed in claim 5, wherein said connecting portion of said frame structure is coupled to said base member via a rocker arm pivotally connected to each said connecting portion and said base member, said rocker arm pivoting about two axes extending substantially parallel with said swiveling axis.

9. The rope saw as claimed in claim 5, wherein said third deflection roller is secured to a tensioning slide mounted on said connecting portion of said frame structure, said third deflection roller being displaceable along said tensioning slide in a direction generally parallel with said sliding axis.

* * * * *

UNITED STATES PATENT AND TRADEMARK OFFICE
CERTIFICATE OF CORRECTION

PATENT NO. : 5 303 689
DATED : April 19, 1994
INVENTOR(S) : Wolfgang MAYER

It is certified that error appears in the above-identified patent and that said Letters Patent is hereby corrected as shown below:

Column 4, line 4; change "connection"
 to ---connecting---.

Signed and Sealed this

Second Day of August, 1994

Attest:

BRUCE LEHMAN

Attesting Officer

Commissioner of Patents and Trademarks